US 6,554,031 B2

(12) United States Patent
Channing

(10) Patent No.: US 6,554,031 B2
(45) Date of Patent: Apr. 29, 2003

(54) TWO FLUID DISPENSING APPARATUS TO SUPPLY FUEL AND REDUCTANT TO A VEHICLE

(75) Inventor: Derek Albert Channing, Livonia, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 10/063,035

(22) Filed: Mar. 13, 2002

(65) Prior Publication Data
US 2002/0170616 A1 Nov. 21, 2002

Related U.S. Application Data

(63) Continuation-in-part of application No. 09/681,664, filed on May 17, 2001, and a continuation-in-part of application No. 09/682,543, filed on Sep. 18, 2001.

(51) Int. Cl.[7] .................................................. B65B 1/04
(52) U.S. Cl. ........................ 141/9; 141/100; 141/285; 220/86.2; 220/86.3
(58) Field of Search ............................. 141/9, 100, 104, 141/286, 234, 236, 237, 285, 301, 302, 94; 220/86.2, 86.3; 137/256, 262

(56) References Cited

U.S. PATENT DOCUMENTS

| 3,730,216 | A | 5/1973 | Arnett et al. |
| 3,845,877 | A | 11/1974 | Arnett et al. |
| 3,911,977 | A | 10/1975 | Berger |
| 3,942,564 | A | 3/1976 | Makazalo |
| 5,178,197 | A | 1/1993 | Healy |
| 5,706,871 | A | 1/1998 | Andersson et al. |
| 6,032,703 | A | 3/2000 | Baker et al. |
| 6,041,965 | A | 3/2000 | Smith |
| 6,142,744 | A | 11/2000 | Taylor |
| 6,216,755 | B1 | 4/2001 | Neufert |

OTHER PUBLICATIONS

Baker et al., Urea Infrastructure for Control of Vehicular NOx Emissions (no date).

Primary Examiner—Steven O. Douglas
(74) Attorney, Agent, or Firm—Diana D. Brehob

(57) ABSTRACT

A fuel filling system is disclosed for dispensing two fluids to a vehicle, which ensures that a reductant tank is filled during dispensing of fuel.

31 Claims, 9 Drawing Sheets

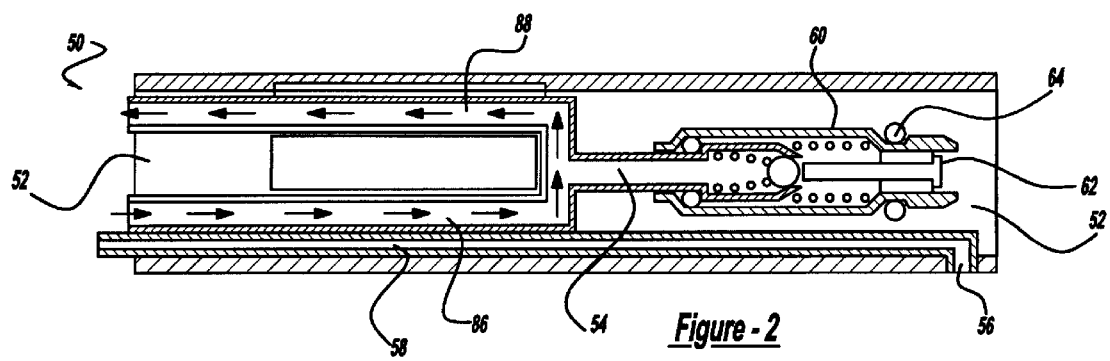
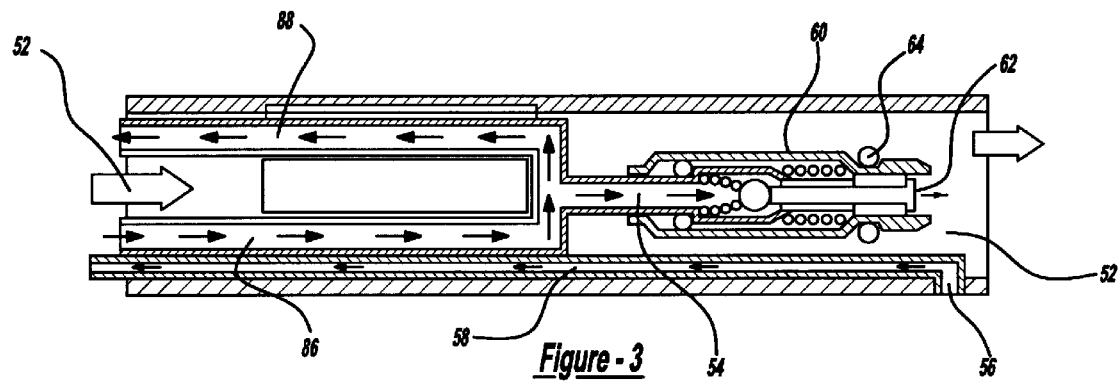

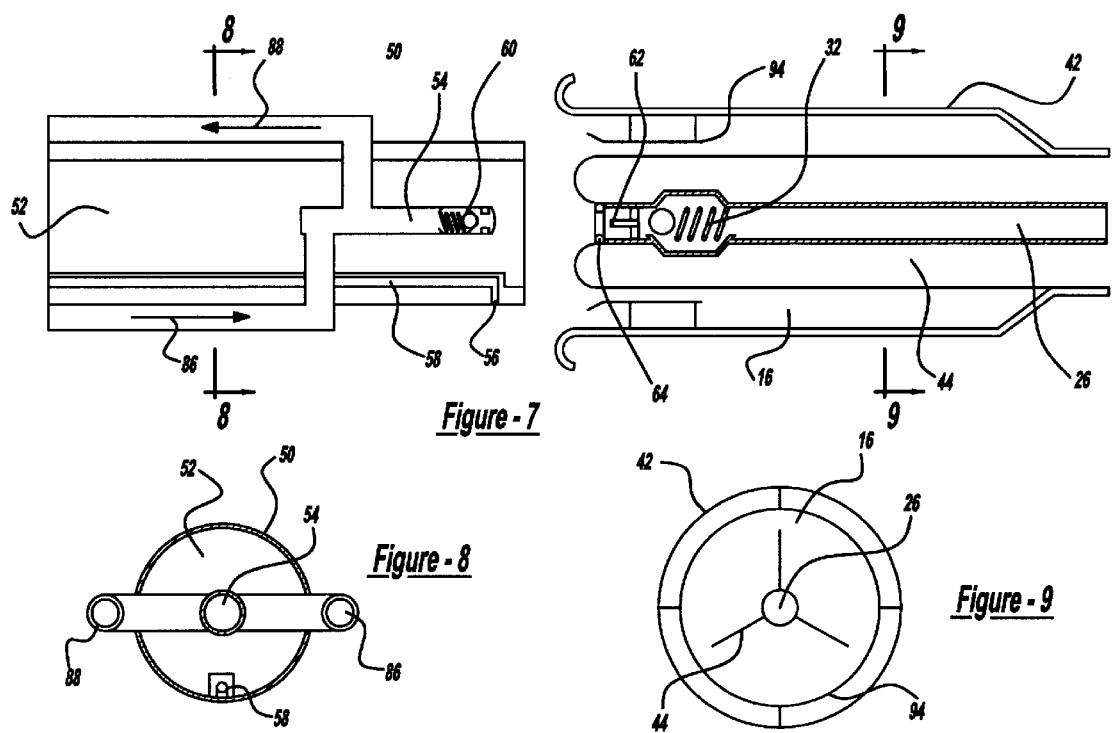

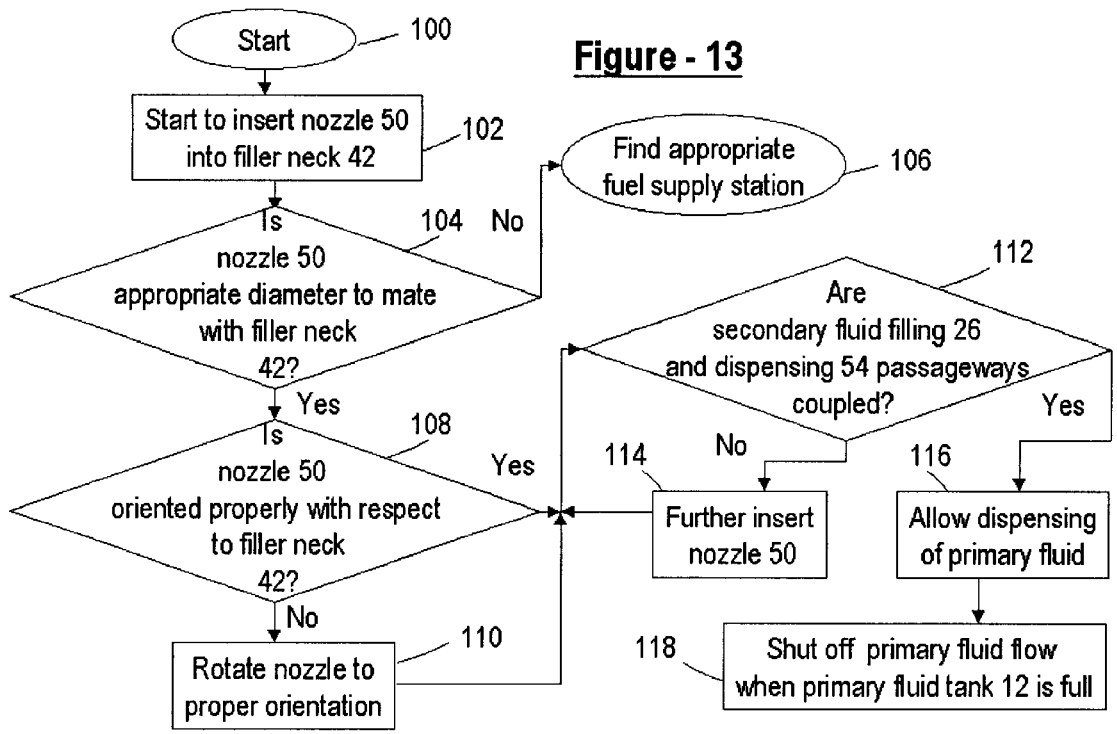

TWO FLUID DISPENSING APPARATUS TO SUPPLY FUEL AND REDUCTANT TO A VEHICLE

CROSS REFERENCE TO RELATED APPLICATIONS

This is a Continuation-In-Part of U.S. Ser. No. 09/681,664, filed May 17, 2001, and U.S. Ser. No. 09/682,543, filed Sep. 18, 2001. U.S. Ser. No. 09/681,664 and U.S. Ser. No. 09/682,543 are incorporated herein by reference in their entirety.

BACKGROUND OF INVENTION

1. Field of the Invention

The present invention relates to a two-fluid dispensing system for supplying two fluids from a fuel reservoir and a reductant reservoir to a fuel tank and a reductant tank, respectively. The system ensures that the reductant tank is replenished during fueling of the vehicle.

2. Background of the Invention

Diesel engines are subject to increasingly stringent regulations on the allowable emission levels of nitrogen oxides. One measure to reduce nitrogen oxides (NOx) emitted at the tailpipe is to process exhaust gases discharged from the engine in a lean NOx catalyst.

Lean NOx catalysts are able to process NOx in the presence of a reducing agent. Commonly used reducing agents are fuel, hydrocarbons (other than fuel), and urea, an aqueous solution of ammonia. Liquid hydrocarbons other than fuel, urea, and any other liquid reductant, that might be identified to reduce NOx, are provided from a reservoir. If the diesel engine is mobile, a reductant reservoir is supplied on board the vehicle.

In U.S. Pat. No. 6,216,755 B1, a device for simultaneously filling a fuel tank and a reducing agent tank with a single pump nozzle is disclosed. The inventors of the present invention have recognized a primary problem with '755 in that the '755 system contains no provision to prevent the operator of the vehicle from filling the fuel tank using a diesel only dispenser. Thus, although '755 provides for simultaneous filling of the two tanks, the operator may not avail themselves of that facility due to economic or convenience reasons. If the reductant tank were depleted, a serious degradation in the efficacy of the exhaust aftertreatment device would result; thus, leading to an increase in NOx emissions from the vehicle. The inventors of the present invention have recognized that there is no provision for ensuring that the reductant tank is replenished in the '755 system.

SUMMARY OF INVENTION

Disadvantages of prior approaches are overcome by a dispensing system for periodically dispensing a primary fluid from a primary reservoir disposed in a dispenser to a primary tank onboard a vehicle and dispensing a secondary fluid from a secondary reservoir disposed in the dispenser to a secondary tank onboard the vehicle. Both the primary fluid and the secondary fluid are dispensed through a dispensing nozzle coupled to the primary reservoir and the secondary reservoir. The dispensing system includes: a primary dispensing passageway through which the primary fluid flows from the primary reservoir to the dispensing nozzle, a secondary dispensing passageway through which the secondary fluid flows from the secondary reservoir to the dispensing nozzle, a primary valve located in the primary dispensing passageway, a secondary valve located in the secondary dispensing passageway, and a retaining means for retaining the primary valve in a closed position when the secondary valve is in a closed position. The dispensing system provides that the ratio of a dispensing flow rate of the secondary fluid to the dispensing flow rate of the primary fluid is greater than a ratio based on an anticipated consumption rate during engine operation of the secondary fluid relative to the primary fluid.

Also disclosed is a system onboard a vehicle for periodically receiving a primary fluid and a secondary fluid from a dispensing system. The dispensing system includes a primary fluid reservoir, a secondary fluid reservoir, and a dispensing nozzle coupled to the primary fluid reservoir and the secondary fluid reservoir. The system onboard the vehicle includes: a filler neck coupled to the exterior of the vehicle into which a dispensing nozzle is coupled, a primary fluid tank disposed on the vehicle, a primary filling passageway connected to the filler neck at an upstream end of the primary filling passageway and connected to the primary fluid tank at a downstream end of the primary filling passageway, the primary filling passageway conducts primary fluid from the filler neck to the primary fluid tank, a secondary fluid tank disposed on the vehicle, a secondary filling passageway disposed in the filler neck at an upstream end of the secondary filling passageway and connected to the secondary fluid tank, and a preventing means to prevent receiving of the primary fluid until flow of secondary fluid through the secondary filling passageway is initiated.

A method is also disclosed for periodically dispensing a primary fluid from a primary reservoir disposed in a dispensing system to a primary tank onboard a vehicle and periodically dispensing a secondary fluid from a secondary reservoir disposed in a dispensing system to a secondary tank onboard a vehicle. The secondary fluid is dispensed from the secondary fluid reservoir to the secondary fluid tank when a level in the secondary fluid tank is less than a predetermined level; the flow of the primary fluid from the primary fluid reservoir to the primary fluid tank is prevented when a level in the secondary fluid tank is less than a predetermined level.

A primary advantage of the present invention is that, in some conditions, primary fluid may not be dispensed unless the secondary fluid is also dispensed. If the primary fluid is diesel fuel, the operator is motivated to refill the primary tank to propel their vehicle. Secondary fluid (reductant) is dispensed concurrently with fuel or secondary fluid dispensing is initiated prior to dispensing fuel. In either case, a supply of reductant for emission control is ensured.

A further advantage of the present invention is that because two fluids are dispensed into two tanks through one nozzle, the operator is presented with a dispensing system similar to prior experience. That is, secondary fluid may be dispensed without additional action upon the part of the operator. In fact, the operator may not even be aware that a secondary fluid is being dispensed.

Another advantage of the present invention is that because the dispensing flow rate of secondary fluid is such that it is dispensed faster than its anticipated use rate relative to the dispensing flow rate of primary fluid, the secondary fluid tank is filled prior to when the primary fluid tank is replenished thus ensuring that secondary fluid is available on board to supply the exhaust aftertreatment system.

Yet another advantage of the present invention is that shut off of the secondary flow is provided, thereby addressing spillage and fluid intermixing concerns.

BRIEF DESCRIPTION OF DRAWINGS

The advantages described herein will be more fully understood by reading an example of an embodiment in which the invention is used to advantage, referred to herein as the Detailed Description, with reference to the drawings wherein:

FIG. 2 is a sketch of a dispensing nozzle which is shutoff, according to an aspect of the present invention;

FIG. 3 is a sketch of a dispensing nozzle through which fluid is being dispensed, according to an aspect of the present invention;

FIG. 7 is a sketch of an alternative embodiment of a dispensing nozzle and a filler neck, according to an aspect of the present invention;

FIG. 8 is a cross-section of the dispensing nozzle of FIG. 7, according to an aspect of the present invention;

FIG. 9 is a cross-section of the filler neck of FIG. 7, according to an aspect of the present invention;

FIG. 13 is a flowchart showing a fueling procedure, according to an aspect of the present invention.

DETAILED DESCRIPTION

Figure 1:
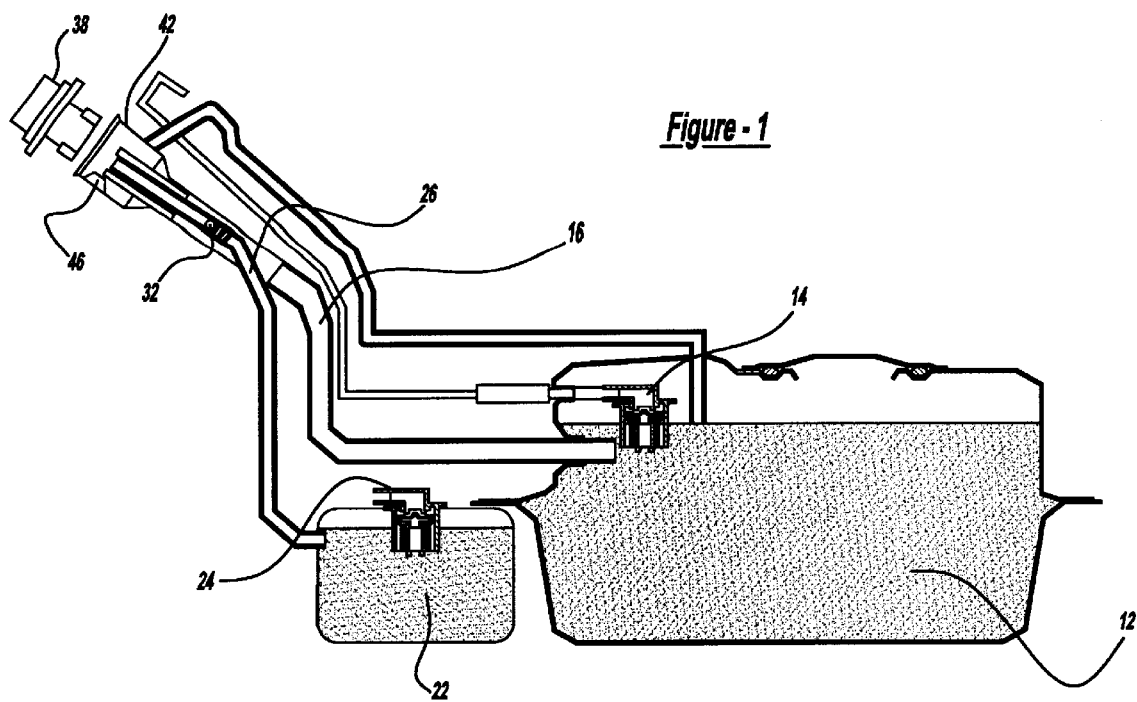
FIG. 1 is a sketch of primary and secondary fluid tanks and a filler neck through which the primary and secondary fluids are supplied to the tanks, according to an aspect of the present invention.

In FIG. 1, a primary fluid tank 12, which holds a primary fluid, and a secondary fluid tank 22, which holds a secondary fluid, are connected to filler neck 42 by primary filling passageway 16 and secondary filling passageway 26, respectively. Filler neck 42 is connected to the vehicle (not shown in FIG. 1) and provides the opening for dispensing fluids to the vehicle. Cap 38 fits onto filler neck 42.

Discriminator insert 44, which is attached to filler neck 42, may provide at least two functions. Discriminator insert 44 houses secondary fluid passageway 26, which conducts secondary fluid down filler neck 42 through check valve 32 and into secondary fluid tank 22. Check valve 32 opens under secondary fluid supply pressure. Alternatively, valve 32 is a manually actuated valve. Or, in another alternative, valve 32 is a pintle operated valve, similar to valve 60 as that shown in FIG. 2. Valve 32 is opened when the nozzle 50 is fully coupled with filler neck 42. In this alternative, the spring within valve 60 is stiffer than the valve within valve 32 to ensure that that the receiving side is opened prior to the supply side. Discriminator insert 44 prevents the insertion of nozzles with inside diameter less than the diameter of discriminator insert 44 to ensure that only the proper nozzles are allowed to mate with the vehicle.

Combination vent valves 14 and 24 located in the primary and secondary fluid tanks, respectively, provide the following functions: shutoff of fuel dispensing provided by a float valve, pressure relief provided by a pressure relief valve set at a minimal pressure for the primary fluid tank, but at a pressure higher than supply pressure for the secondary fluid tank, vacuum relief provided by a vacuum valve which permits the entry of air as the fluid is consumed during normal vehicle operation, and spill prevention provided by a gravity valve.

Referring to FIG. 2, dispensing nozzle 50 contains a secondary fluid dispensing passageway 54 which is supplied secondary fluid via a secondary fluid supply 86. A secondary fluid delivery valve 60 is located close to the opening of secondary fluid dispensing passageway 54 to prevent inadvertent release of the secondary fluid and to prevent inadvertent contamination of primary fluid with secondary fluid and vice versa. Dispensing nozzle 50 also contains primary fluid passageway 52. A primary fluid dispensing valve controlling the flow of the primary fluid through dispensing nozzle 50 is located upstream of dispensing nozzle 50. Vacuum shutoff passageway 58 connects between a vacuum source situated upstream of dispensing nozzle 50 (vacuum source not shown) and a vacuum shutoff sensor orifice 56. Flow of primary fluid through dispensing nozzle 50 continues until vacuum shutoff sensor orifice 56 is covered by fluid, that is, the tank is substantially full. At that point, a vacuum is developed within the vacuum shutoff passageway 58 causing the primary fluid dispensing valve (not shown) to shut off, thereby preventing further dispensing of the primary liquid.

Figure 6:
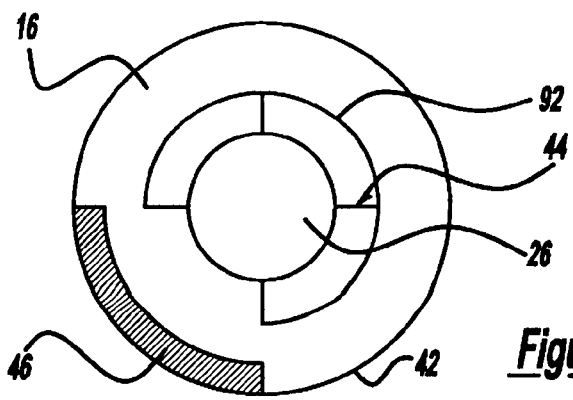
FIG. 6 is a cross-sectional of a filler neck, according to an aspect of the present invention.

The downstream section of dispensing nozzle 50 is circumferential, except for vacuum shutoff passageway 58, as shown in FIGS. 2 and 3. To dispense primary fluid, nozzle 50 is coupled to filler neck 42, a cross-section of which is shown in FIG. 6. Filler neck 42 contains a discriminator insert 44. Discriminator insert 44 may comprise multiple fins on the exterior surface of secondary fluid filling passageway 26. Vacuum passageway blocker sector 92, forms a partial ring around discriminator insert 44 except that a portion of the ring is removed; 90° of the circumference of a ring is missing in the present example. The portion of the ring that is removed provides space for vacuum shutoff passageway 58 of dispensing nozzle 50 when the two are coupled. Dispensing nozzle 50 is inserted into filler neck 42 with the centerline axes of both coincident with a range of orientations; a range of approximately +/−40°, in the present example. That is, vacuum shutoff passageway 58 mates with the removed sector of vacuum passageway blocker sector 92. Otherwise, vacuum shutoff passageway 58 would collide with vacuum passageway blocker sector 92 preventing coupling of dispensing nozzle 50 with filler neck 42.

The significance of the indexing function of vacuum passageway blocker 92 will become apparent in the following discussion; the inventor of the present invention has envisioned an additional use for the vacuum shutoff apparatus, which will become apparent in regards to FIGS.

5a–c in which engagement of dispensing nozzle 50 and filler neck 42 is considered. When dispensing nozzle 50 mates with filler neck 42, the asymmetric features on each, the vacuum shutoff passageway 58 and the vacuum passageway blocker 92, respectively, allow insertion in only a range of orientations. Filler neck 42 has an inhibitor pad 46 covering a sector of the interior surface of filler neck 42, shown in cross-section FIG. 6 as 90°. During insertion of dispensing nozzle 50 into filler neck 42, vacuum shutoff sensor orifice 56 is covered by inhibitor pad 46, thereby causing a vacuum to be developed in vacuum shutoff passageway 58 preventing the primary fluid from being dispensed. The length of inhibitor pad 46 is such that when dispensing nozzle 50 is fully inserted into filler neck 52, vacuum shutoff sensor orifice is beyond inhibitor pad 46, thus allowing primary fluid to be dispensed. The term fully inserted herein means that dispensing nozzle 50 is inserted such that secondary fluid dispensing passageway 54 and secondary fluid filling passageway 26 are coupled to allow dispensing of secondary fluid.

Figure 5A:
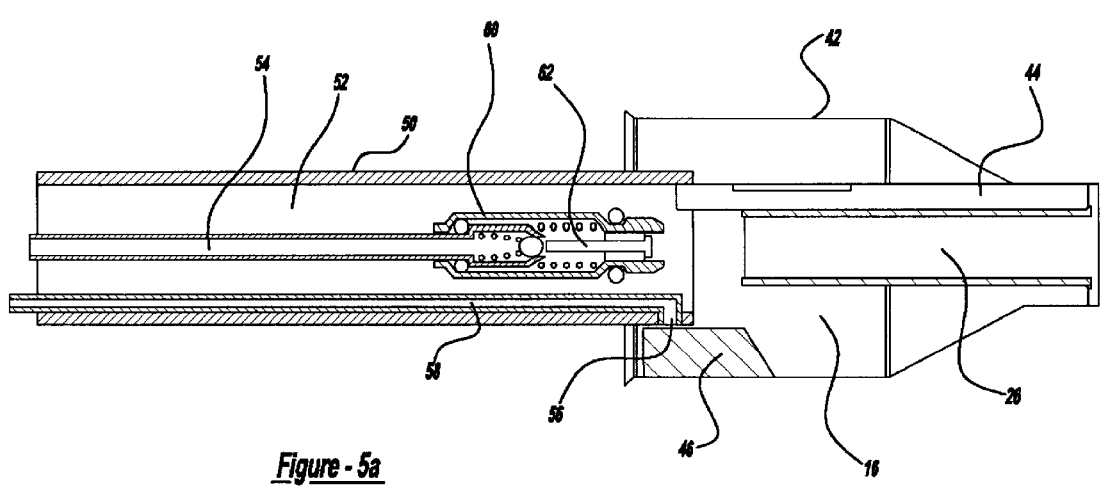
FIG. 5a is a sketch of a dispensing nozzle uncoupled to a filler neck.
Figure 5B:
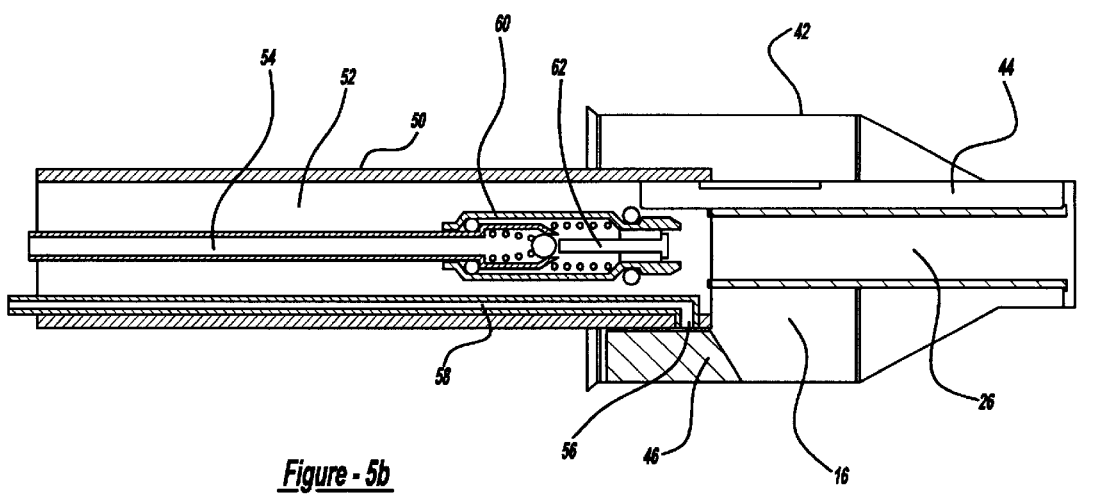
FIG. 5b is a sketch of a dispensing nozzle partially coupled to a filler neck, without dispensing primary or secondary fluids, according to an aspect of the present invention.
Figure 5C:
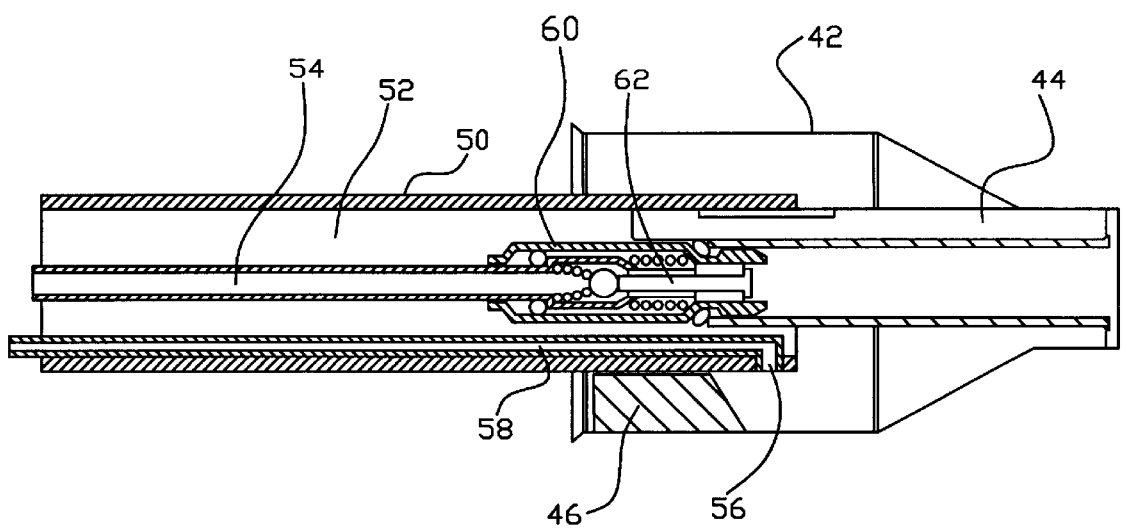
FIG. 5c is a sketch of a dispensing nozzle fully coupled to a filler neck, allowing dispensing primary and secondary fluids, according to an aspect of the present invention.

Referring now to FIGS. 5a–c, in FIG. 5a, dispensing nozzle 50 and filler neck 42 are not coupled and neither fluid is flowing. The primary fluid is prevented from flowing due to vacuum shutoff sensor orifice 56 being covered by inhibitor pad 46. The secondary fluid is prevented from flowing due to secondary fluid delivery valve 60 being in its normally closed position. In FIG. 5b, dispensing nozzle 50 and filler neck 52 are partially coupled. Again, primary fluid is prevented from being dispensed by vacuum shutoff sensor orifice 56 being covered by inhibitor pad 46. Fluid separation seal 64 mates with the secondary fluid filling passageway 26. However, secondary fluid delivery valve 60 remains closed. In FIG. 5c, when dispensing nozzle 50 is more fully coupled with filler neck 42, the secondary fluid passageways are fully coupled. Delivery valve 60 is opened. Delivery valve opening pin 62 pushes the ball off the seat in valve 60. Specifically, fluid separation seal 64 prevent movement of the tip of the secondary fluid delivery valve 60 beyond the illustration in FIG. 5b. In response, the internal spring of secondary fluid delivery valve 60 is compressed and secondary fluid is allowed to flow from secondary dispensing passageway 54 through secondary receiving passageway in filler neck 42. The primary fluid is allowed to flow because vacuum shutoff sensor orifice 56 is inserted beyond inhibitor pad 46. Fluid separation seal 64 prevents intermixing of the two fluids during dispensing.

Alternatively, check valve 32 an alternative embodiment of dispensing nozzle 50 and filler neck 42 is shown in FIG. 7. In this embodiment, primary fluid is prevented from being dispensed until secondary fluid is concurrently dispensed, with a difference from the embodiment described above being that dispensing nozzle 50 may be coupled to filler neck 42 in any angular position, i.e., no indexing. In FIG. 7, a secondary fluid supply 86 and return 88 are provided to secondary fluid dispensing passageway 54. Delivery valve opening pin 62 is shown installed in filler neck 42. A cross-section of dispensing nozzle 50 is shown in FIG. 8 showing secondary fluid supply 86, secondary fluid return 88, vacuum shutoff passageway 58, and primary fluid dispensing passageway 52. Filler neck 42 contains an inhibitor ring 94 on the internal surface. Inhibitor ring 94 substantially prevents primary fluid to be dispensed unless dispensing nozzle is inserted sufficiently into filler neck 42 so that vacuum shutoff sensor orifice 56 is inserted beyond inhibitor ring 94. When dispensing nozzle 50 is inserted sufficiently to allow primary fluid to be dispensed, delivery valve opening pin 62 opens secondary fluid delivery valve 32 causing the secondary fluid to be dispensed immediately. A cross-section of filler neck 42 is shown in FIG. 9 indicating blocker ring 94 extends around the circumference of the filler neck 42. FIG. 9 shows three fins for discriminator insert 44, by way of example. Any plurality of fins for discriminator insert 44 may be used. Discriminator insert 44 provides support for secondary fluid passageway, as shown in FIG. 7. Primary fluid filling passageway 16 comprises the space inside inhibitor ring 94 which is external to secondary fluid filling passageway 26 excluding space occupied by discriminator insert 44.

Preferably, the discriminator insert 44 and inhibitor pad 46 are covered with a low friction coating to improve the ease of coupling dispensing nozzle 50 with filler neck 42. Separation seal 64 is shown in FIG. 3 as an O-ring. Alternatively, separation seal 64 is a teflon coated lip seal. Alternatively, other O-rings shown in valve 60 in FIG. 5a are also teflon coated lip seals.

The present invention provides for the prevention of buildup of dried urea by having the fresh urea flush over sealing surfaces to redissolve any solid precipitate.

If the present invention is used on a diesel vehicle, in which primary fluid tank 12 contains diesel fuel, and secondary fluid tank 22 contains reductant, it is desirable that the operator be disallowed from filling primary tank 12 without also filling secondary tank 22. The location of pad 46 is such that during the procedure of inserting dispensing nozzle 50 into filler neck 42, secondary fluid delivery valve 60 and check valve 32 are opened causing secondary fluid to flow prior to vacuum shutoff sensor orifice 56 being uncovered by inhibitor pad 46. This ensures that primary fluid tank 12 may not be supplied fuel without secondary fluid tank 22 being supplied reductant. The clearances between dispensing nozzle 50 and inhibitor pad 46 as well as inhibitor pad material are selected to ensure that when vacuum shutoff sensor orifice 56 is in the proximity of inhibitor pad 46, that inhibitor pad 46 covers vacuum shutoff sensor orifice 46 sufficiently such that a vacuum is developed in vacuum shutoff passageway 58 to restrict the flow of primary fluid.

It is desirable that dispensing nozzle 50 be able to dispense a primary fluid to a prior generation vehicle, that is, one which does not use a secondary fluid. Because the filler neck of a prior generation vehicle does not contain inhibitor pad 46 or inhibitor ring 94, vacuum shutoff sensor orifice 56 is not covered and the vacuum shutoff does not prevent dispensing the primary fluid. Furthermore, the filler neck of a prior generation vehicle does not contain a secondary fluid filling passageway 26 which would actuate the secondary fluid delivery valve 60. Thus, the present invention provides for dispensing only primary fluid to prior generation vehicles, that is, those without secondary fluid tanks 22.

The embodiments described above provide for disallowing dispensing a primary fluid, which may be diesel fuel, to a vehicle which is equipped with a secondary fluid tank, the secondary fluid tank may store reductant. Primary fluid is prevented from being dispensed by occluding vacuum shutoff sensor orifice 56. Prior generation vehicles, which do not contain a secondary fluid tank, are able to be fuelled with the system of the present invention as it would not contain an inhibitor pad 46 or inhibitor ring 96 in its filler neck 42. Thus, the present invention allows for both types of vehicles to be dispensed appropriate fluids to replenish their tanks. Furthermore, intervention on the part of the operator to provide the distinction is avoided. An additional advantage of the above described embodiments is that addition of secondary fluid is provided for without operator intervention and secondary fluid tank replenishment is accomplished during primary fluid dispensing intervals.

Figure 10:
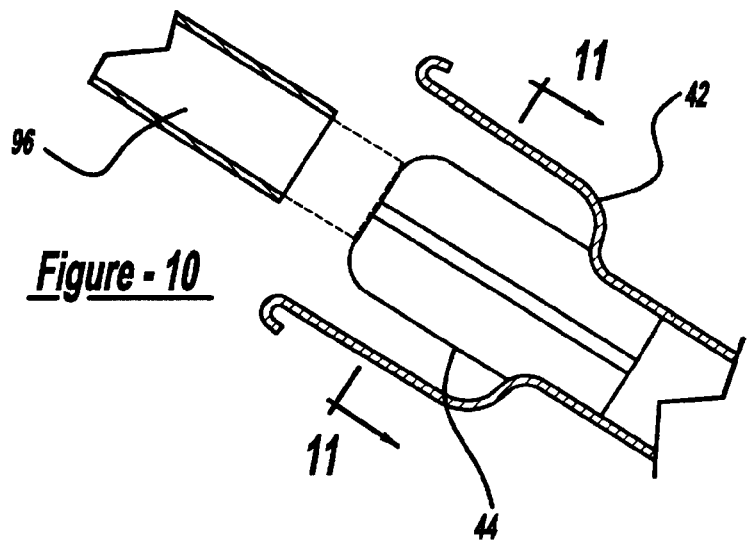
FIG. 10 is a sketch of a dispensing nozzle and a filler neck, according to an aspect of the present invention.
Figure 11:
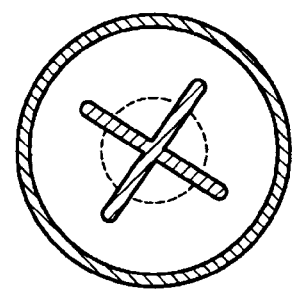
FIG. 11 is a cross-section of the filler neck of FIG. 10, according to an aspect of the present invention.
Figure 12:
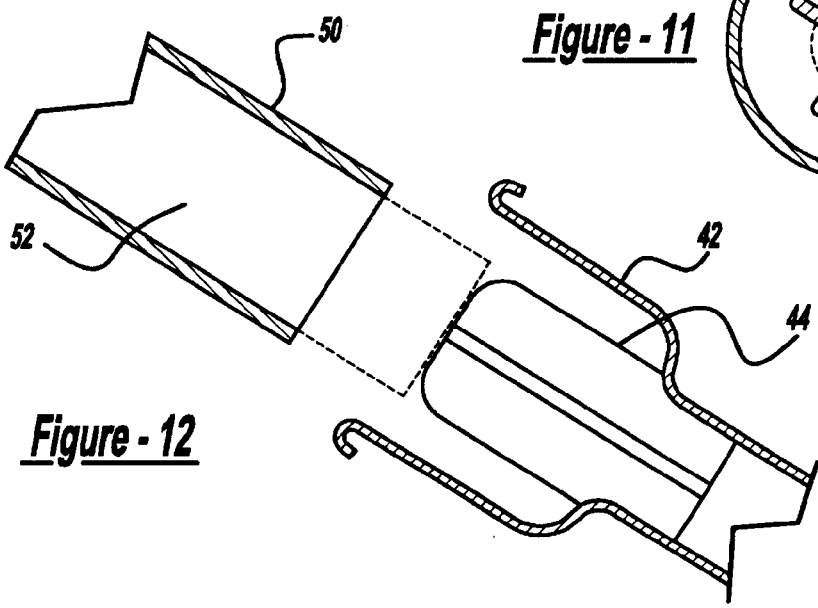
FIG. 12 is a sketch of a dispensing nozzle and a filler neck, according to an aspect of the present invention.

In prior art diesel fuel dispensing systems, petrol (alternatively called gasoline) may be added to diesel fuel tanks with serious potential for negative consequences: potential ruin of the fuel injection hardware and the engine. The present invention, which includes inhibitor insert 44, prevents such unintended misfueling when the outside diameter of inhibitor insert 44 is purposely greater than an inside diameter of the petrol dispensing nozzle. Because the operator is prevented from inserting the gasoline nozzle into filler neck 42 and would, thus, suspect a problem by the inability of a gasoline nozzle to be inserted into filler neck 42. Referring to FIG. 10, an alternative fluid dispensing nozzle 96 is shown. Because the inside diameter of alternative fluid dispensing nozzle 96 is smaller than the outside diameter of discriminator insert 44, alternative fluid dispensing nozzle 96 cannot be inserted into filler neck 42. The cross-section of filler neck 42 is shown in FIG. 11, showing discriminator insert 44 as a four-pointed star. Discriminator insert 44 may have a minimum of two points to perform the desired function. Referring to FIG. 12, the inside diameter of dispensing nozzle 50 is large enough to mate with discriminator insert 44. Consequently, a vehicle equipped with discriminator insert 44 permits insertion of dispensing nozzles 50 of appropriate diameter only. FIGS. 11 and 12 indicate a general application of a discriminator insert, regardless of whether the dispensing system is for single or multiple fluid. Furthermore, filler neck 42 prevents fueling with dispensing nozzles 50 with greater outside diameter than the inside diameter of filler neck 42.

It is desirable that the operator of a vehicle equipped with both primary fluid tank 12 and secondary fluid tank 22 uses a fuel dispensing station, which provides for both tanks to be replenished. To prevent the operator from using a dispenser of primary fluid which does not also have the facility for filling of the secondary fluid, the outside diameter of inhibitor insert 44 is greater than the inside diameter of diesel-only dispensing nozzles. In this way, the operator may be prevented from dispensing a primary fluid without, at the same time, filling secondary fluid tank 22.

In summary, discriminator insert 44 may be used to prevent petrol being dispensed into a diesel-equipped vehicle. Another advantage, which may be provided by discriminator insert 44, is that vehicles equipped with reductant tanks may be prevented from fueling at diesel-only fuel dispensing stations.

Filler neck 42 and dispensing nozzle 50 may be fabricated of electrically conductive materials. Specifically, vacuum shutoff passageway 58 of dispensing nozzle 50 and inhibitor pad 46 (or inhibitor ring 94 in the alternative embodiment), i.e., elements such as these examples, which are in contact when dispensing occurs, may be made of electrically conductive materials.

Secondary fluid tank 22 may contain an aqueous solution of ammonia or urea, which freezes at 12° C. and is predominantly comprised of water and, thus, expands upon freezing. Although the shape of secondary fluid tank 22 in FIG. 1 is of a conventional shape, secondary fluid tank 22 may be that of a frustum of a cone with the larger diameter cross-section elevated higher than the smaller diameter cross-section. Tanks with cross-sectional area increasing monotonically from the bottom of the tank to the top of the tank allow expansion space for fluids which expand upon freezing. Although occasional freezing of the urea may occur under unusual climatic conditions during vehicle soak periods, the urea tank may be installed proximately to a heat rejecting element in the vehicle such that it attains a temperature greater than 12° C. readily upon reactivation of the vehicle 10. Heat rejecting elements may be an engine, a radiator, an oil pan, an exhaust element, as examples.

Figure 4:
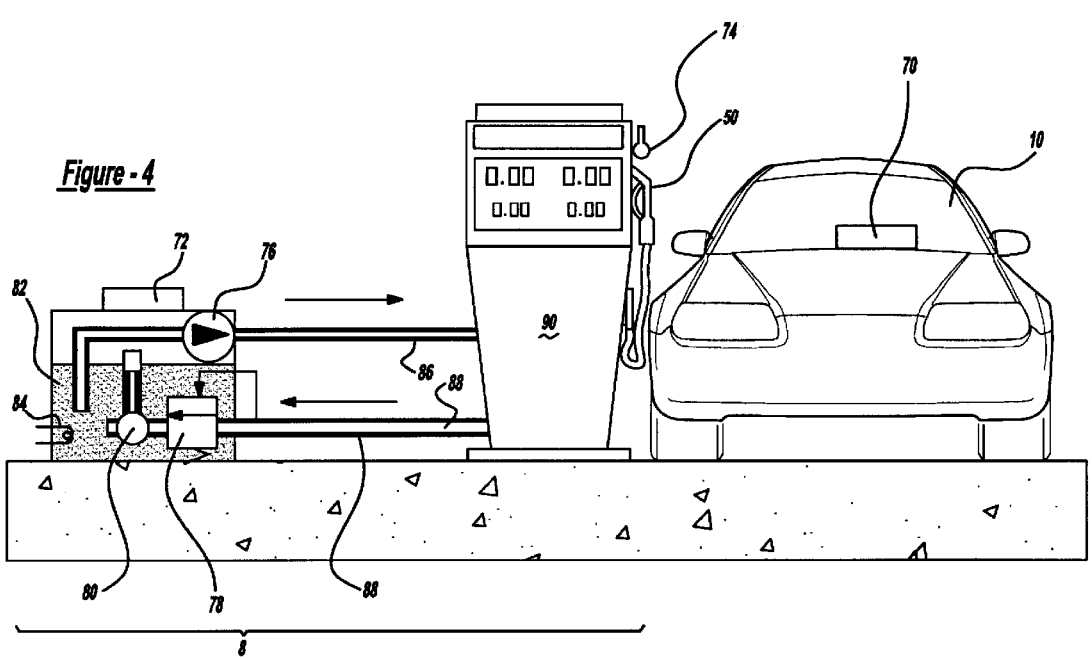
FIG. 4 is a sketch of a vehicle at a dispensing station, according to an aspect of the present invention.

Freezing of urea in the dispensing system may be avoided by circulating urea through dispensing nozzle 50 via a secondary fluid supply 86 and a secondary fluid return 88, as shown in FIGS. 2, 3 and 7. If urea reservoir 82 is underground, urea is maintained at a temperature of about 10–15° C. By circulating flow within dispensing nozzle 50, freezing of the urea is prevented, expect, perhaps, at the very lowest ambient temperature conditions. If urea reservoir 82 is above ground, as shown in FIG. 4, a secondary fluid heater 84 may be employed to maintain a desired temperature to prevent freezing of urea. Temperature sensor 74 may be relied upon to determine when to require a circulating flow should be pumped through secondary fluid supply 86 and secondary fluid return 88 by secondary fluid pump 76 and when secondary fluid heater 84 should be employed. Alternatively, a signal from a secondary fluid outlet temperature sensor 80 may be used to determine requirements for circulating flow and heating of the secondary fluid.

Fluid delivering and receiving means are discussed above in reference to FIGS. 1–5. Possible other means include, but are not limited to: pumps, electronic actuators, support brackets, springs, valves, reservoirs, tubing, tubing connectors, fittings, pressure sensing devices, fluid level sensing devices, The shutoff apparatus for dispensing the primary fluid has been discussed above. However, a solution should be provided for ceasing flow to secondary tank 22 when it is full. When secondary tank 22 is full, combination vent valve 24 closes causing pressure in secondary tank 22 to equal delivery pressure, thereby causing flow to cease. Secondary tank 22 may be designed to withstand the delivery pressure without rupturing. The dispensing system may contain a secondary fluid pressure regulator 78 on the supply side to maintain a predetermined pressure less than a design pressure of secondary tank 22.

When dispenser nozzle 50 is uncoupled from filler neck 42, check valve 32 in secondary fluid filling passageway 26 prevents secondary fluid from contaminating primary fluid filling passageway 16. Preferably, check valve 32 should be as close to the inlet tip of secondary fluid filling passageway 26 to minimize contamination between primary and secondary fluids.

Alternatively, a level sensor (not shown) on secondary tank 22 may communicate to a transponder 70 on vehicle 10, FIG. 4. Transponder 70 may send a signal indicating fluid level to a transceiver 72 coupled to secondary fluid reservoir 82 and secondary fluid pump 76. When secondary tank 22 is full, a valve (not shown), located upstream of dispensing nozzle 50, is commanded to cease delivery of the secondary fluid.

Mechanical solutions by which the flow of primary fluid is prevented prior to initiating flow of a secondary flow is discussed above. Other examples can also be used. If vehicle 10 and fuel dispensing system 8 are fitted with radio communication, i.e., transponder 70 and transceiver 72, respectively, an electrically-actuated valve in primary fluid dispensing passageway 52 prevents primary fluid flow until secondary fluid flow is occurring. The dispensing status of the secondary fluid is sensed by flow metering onboard the dispensing system and a level sensor on the secondary tank. In another alternative, valves in the primary and secondary passageways in the dispenser are mechanically coupled meaning that the hand held operator trigger is used to initiate and cease dispensing of both fluids.

An example of a solution to automatic shutoff is discussed in reference to FIG. 4. Additional automatic shutoff means may include: electrically actuated valves, pressure sensing devices, fluid level sensing devices, piping, connectors, and electronic actuators.

The volume of secondary fluid tank 22 is sized to ensure that secondary fluid is substantially always available. If the volume of secondary fluid tank 22 is determined based on the product of the volume of primary fluid tank 12 and R, where R is the maximum ratio of the consumption rate of secondary fluid divided by the consumption rate primary fluid encountered over the vehicle's operating range. If it is found in development that the volume of secondary fluid tank 22 based on R is larger than necessary for vehicle 10, even when considering engine operating scenarios consuming the greatest fraction of secondary fluid, the volume of secondary fluid tank 22 may be reduced accordingly.

The processes undertaken in dispensing are shown in FIG. 13. The process is initiated in block 100. Dispensing nozzle 50 is engaged with insert 44 of filler neck 42 in block 102 by an operator of the fluid dispensing station. In block 104, it is determined whether dispensing nozzle 50 is of the appropriate diameter to mate with filler neck 42. If not, this indicates that the dispensing nozzle 50 does not contain the appropriate fluid type for vehicle 10. In this case, the operator locates an alternate fuel facility in block 106. In the event of a positive result from block 104, control proceeds to block 108 in which it is determined whether dispensing nozzle 50 is properly indexed with filler neck 42. A negative result in block 108 is indicated when vacuum shutoff passageway 58 of dispensing nozzle 50 interferes with inhibitor pad 46 of filler neck 42. If improper indexing has occurred (negative result in block 108), the operator rotates nozzle 50 with respect to filler neck 42, in block 110, until engagement is possible and a positive result in block 108 is achieved. A positive result in block 108 indicates that dispensing nozzle 50 is engaged with insert 44, it is determined in block 112 whether nozzle 50 is engaged far enough to allow dispensing of secondary fluid, i.e., are filling and dispensing passageways of the secondary fluid passageways coupled. If not, the operator inserts dispensing nozzle 50 farther into filler neck 42, in block 100. If a positive result in block 108, primary fluid and secondary fluid dispensing is permitted in block 112. When the fluids have been dispensed, a valve on the primary dispensing passageway (not shown) automatically shuts off, as provided by the mechanical structure described above in regards to FIGS. 5a–c. When nozzle 50 is removed from filler neck 42 by the operator, valves 32 and 60 in the urea passageway return to their normally closed positions, as made possible according to an aspect of the present invention, as described in regards to FIGS. 5a–c.

The embodiments discussed above refer to dispensing two fluids through a single nozzle. However, the invention discussed herein may be extended to dispense three or more fluids through a single nozzle.

While several modes for carrying out the invention have been described in detail, those familiar with the art to which this invention relates will recognize alternative designs and embodiments for practicing the invention. Thus, the above-described preferred embodiments are intended to be illustrative of the invention, which may be modified within the scope of the following claims.

What is claimed is:

1. A dispensing system for periodically dispensing a primary fluid from a primary reservoir disposed in a dispenser to a primary tank onboard a vehicle and dispensing a secondary fluid from a secondary reservoir disposed in the dispenser to a secondary tank onboard the vehicle, both the primary fluid and the secondary fluid are dispensed through a dispensing nozzle coupled to the primary reservoir and the secondary reservoir, comprising:

a primary dispensing passageway through which the secondary fluid flows from the secondary reservoir to the dispensing nozzle;

a primary valve located in said primary dispensing passageway;

a secondary valve located in said secondary dispensing passageway; and a retaining means for retaining said primary valve in a closed position when said secondary valve is in a closed position.

2. The system of claim 1 wherein said primary fluid is a fuel and said secondary fluid is a reductant.

3. The system of claim 1 wherein said retaining means comprises a transceiver operably connected to said primary valve and said secondary valve, said transceiver is capable of receiving a signal from the vehicle.

4. The system of claim 3 wherein said signal indicates a level of the secondary fluid in the secondary fluid tank.

5. The system of claim 4 wherein said secondary valve is actuated electrically and is actuated based on said signal.

6. The system of claim 5 wherein said primary valve is actuated electrically.

7. The system of claim 6 wherein said primary valve is actuated when said signal provides an indication that the secondary fluid tank is substantially full.

8. The system of claim 1 wherein said retaining means comprises:

a vacuum orifice disposed on the inside surface of the dispensing nozzle;

a vacuum source disposed in the dispensing system; and a vacuum passageway between said vacuum orifice and said vacuum source;

wherein a vacuum exists in said vacuum passageway when said vacuum orifice is substantially occluded, said vacuum passageway is coupled to said primary valve and exerts a force on said primary valve causing it to close when a vacuum exists in said vacuum passageway.

9. The system of claim 8 wherein said retaining means further comprises:

a filler neck coupled to the exterior of the vehicle into which the dispensing nozzle is coupled, said opening of said filler neck is proximate to said exterior of the vehicle; and a protuberance located on the inside surface of said filler neck extending a predetermined distance from said opening of said filler neck, said protuberance is proximate to said vacuum orifice and substantially occludes said vacuum orifice when the dispensing nozzle is incompletely coupled with said filler neck.

10. The system of claim 9 wherein the dispensing nozzle is substantially fully coupled when the dispensing nozzle is inserted into said filler neck a distance that provides that said vacuum orifice is beyond said protuberance.

11. The system of claim 10, further comprising:

a secondary fluid tank disposed on the vehicle;

a secondary filling passageway with a receiving end disposed in said filler neck and a downstream end coupled to said secondary fluid tank; and a housing rigidly connected to said filler neck, said secondary filling passageway is disposed in said housing.

12. The system of claim 11, further comprising:
a pin disposed in said secondary fluid valve; and
a spring disposed in said secondary fluid valve coupled to said pin, said secondary fluid valve opens when said pin compresses said spring, said housing pushes on said pin when said dispensing nozzle couples with said filler neck causing said secondary fluid valve to open.

13. The system of claim 1 wherein a ratio of a dispensing flow rate of the secondary fluid to the dispensing flow rate of the primary fluid is greater than a predetermined ratio.

14. The system of claim 13, said predetermined ratio is based on an anticipated consumption rate during engine operation of the secondary fluid relative to the primary fluid.

15. A system onboard a vehicle for periodically receiving a primary fluid and a secondary fluid from a dispensing system, the dispensing system includes a primary fluid reservoir, a secondary fluid reservoir, and a dispensing nozzle coupled to the primary fluid reservoir and the secondary fluid reservoir, comprising:
a filler neck coupled to the exterior of the vehicle into which a dispensing nozzle is coupled, the receiving of the primary fluid and the secondary fluid occurs only when the dispensing nozzle is coupled with said filler neck;
a primary fluid tank disposed on the vehicle;
a primary filling passageway connected to said filler neck at an upstream end of said primary filling passageway and connected to said primary fluid tank at a downstream end of said primary filling passageway, said primary filling passageway conducts primary fluid from said filler neck to said primary fluid tank;
a secondary fluid tank disposed on the vehicle;
a secondary filling passageway disposed in said filler neck at an upstream end of said secondary filling passageway and connected to said secondary fluid tank; and
a preventing means to prevent receiving of the primary fluid until flow of secondary fluid through said secondary filling passageway is initiated.

16. The system of claim 15 wherein said primary fluid is a fuel and said secondary fluid is a reductant.

17. The system of claim 15, further comprising a fluid level sensor disposed in said secondary fluid tank.

18. The system of claim 17 wherein said preventing means comprises a transponder operably connected to said fluid level sensor, said transponder provides a signal indicating fluid level in said secondary fluid tank.

19. The system of claim 18 wherein said transponder provides a signal indicating that the vehicle has said secondary fluid tank.

20. The system of claim 18, further comprising a transceiver disposed on said dispensing system, said transceiver receives said transponder signal.

21. The system of claim 20 wherein said dispensing system further comprises a secondary fluid valve disposed in a secondary fluid dispensing passageway between the secondary fluid reservoir and the nozzle, said secondary fluid valve is operably connected to said transceiver and is electronically actuated, said actuation of said secondary fluid valve occurs in response to said signal when said signal indicates that said secondary fluid tank is less than substantially full.

22. The system of claim 15 wherein said dispensing system, further comprises:
a primary fluid valve disposed in said primary filling passageway;
a vacuum orifice disposed on the inside surface of the dispensing nozzle;
a vacuum source; and
a vacuum passageway between said vacuum orifice and said vacuum source, said vacuum passageway is coupled to said primary valve and causes said primary valve to close when a vacuum exists in said vacuum passageway wherein a vacuum exists in said vacuum passageway when said vacuum orifice is substantially occluded, said vacuum exerts a force on said primary valve causing it to close.

23. The system of claim 22 wherein said preventing means is a protuberance located on the inside surface of said filler neck extending a predetermined distance from said opening of said filler neck, said opening of said filler neck is proximate to said exterior of the vehicle, said protuberance is proximate to said vacuum orifice and substantially occludes said vacuum orifice when the dispensing nozzle is incompletely coupled with said filler neck.

24. The system of claim 23 wherein said housing is rigidly attached to said filler neck, said secondary fluid valve contains a spring, said secondary fluid valve is actuated by compressing said spring, and said housing compresses said secondary fluid valve spring when said dispensing nozzle couples with said filler neck.

25. A method for periodically dispensing a primary fluid from a primary reservoir disposed in a dispensing system to a primary tank onboard a vehicle and periodically dispensing a secondary fluid from a secondary reservoir disposed in a dispensing system to a secondary tank onboard a vehicle, comprising the steps of:
dispensing the secondary fluid from the secondary fluid reservoir to the secondary fluid tank when a level in said secondary fluid tank is less than a predetermined level; and
preventing flow of the primary fluid from the primary fluid reservoir to the primary fluid tank when a level in said secondary fluid tank is less than a predetermined level.

26. The method of claim 25, further comprising the step of allowing flow of the primary fluid from the primary fluid reservoir to the primary fluid tank when a level in said secondary fluid tank is greater than a predetermined level.

27. The method of claim 25, further comprising the step of allowing flow of the primary fluid from the primary fluid reservoir to the primary fluid tank when the secondary fluid is being dispensed form the secondary fluid reservoir to the secondary fluid tank.

28. The method of claim 25, further comprising the step of ceasing the step of dispensing the secondary fluid when the secondary fluid tank is substantially full.

29. The method of claim 25 wherein said primary fluid is fuel and said secondary fluid is reductant.

30. The method of claim 29 wherein said fuel is diesel fuel and said reductant is urea, said urea is an aqueous solution of ammonia.

31. The method of claim 25 wherein said predetermined level is a level at which the secondary fluid tank is substantially full.

* * * * *

UNITED STATES PATENT AND TRADEMARK OFFICE
CERTIFICATE OF CORRECTION

PATENT NO. : 6,554,031 B2
DATED : April 29, 2003
INVENTOR(S) : Derek Channing

It is certified that error appears in the above-identified patent and that said Letters Patent is hereby corrected as shown below:

<u>Title page,</u>
Item [75], add the following inventors: -- Michael Levin and Richard E. Baker --.

Signed and Sealed this

Seventh Day of October, 2003

JAMES E. ROGAN
*Director of the United States Patent and Trademark Office*